US009870056B1

(12) United States Patent
Yao

(10) Patent No.: US 9,870,056 B1
(45) Date of Patent: Jan. 16, 2018

(54) HAND AND HAND POSE DETECTION

(71) Applicant: Amazon Technologies, Inc., Seattle, WA (US)

(72) Inventor: Ning Yao, Cupertino, CA (US)

(73) Assignee: Amazon Technologies, Inc., Seattle, WA (US)

(*) Notice: Subject to any disclaimer, the term of this patent is extended or adjusted under 35 U.S.C. 154(b) by 280 days.

(21) Appl. No.: 13/647,188

(22) Filed: Oct. 8, 2012

(51) Int. Cl.
  *G06F 1/16* (2006.01)
  *G06F 3/01* (2006.01)
  *G06F 17/30* (2006.01)

(52) U.S. Cl.
  CPC ............ *G06F 3/017* (2013.01); *G06F 1/1694* (2013.01); *G06F 17/30032* (2013.01)

(58) Field of Classification Search
  None
  See application file for complete search history.

(56) References Cited

U.S. PATENT DOCUMENTS

| | | | | |
|---|---|---|---|---|
| 6,252,598 | B1 * | 6/2001 | Segen | G06F 3/017 345/156 |
| 7,418,392 | B1 | 8/2008 | Mozer et al. | |
| 7,720,683 | B1 | 5/2010 | Vermeulen et al. | |
| 7,774,204 | B2 | 8/2010 | Mozer et al. | |
| 2003/0156756 | A1 * | 8/2003 | Gokturk | G06F 3/017 382/190 |
| 2008/0240514 | A1 * | 10/2008 | Zhang | G06K 9/00006 382/115 |
| 2011/0234840 | A1 * | 9/2011 | Klefenz | G06K 9/00375 348/222.1 |
| 2012/0069168 | A1 * | 3/2012 | Huang | G06F 3/017 348/77 |
| 2012/0223885 | A1 | 9/2012 | Perez | |
| 2013/0057469 | A1 * | 3/2013 | Ajika | G06F 3/017 345/156 |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

(Continued)

*Primary Examiner* — Jennifer Mehmood
*Assistant Examiner* — Parul Gupta
(74) *Attorney, Agent, or Firm* — Lee & Hayes, PLLC

(57) ABSTRACT

Techniques for detecting a hand of a user and a pose of the hand are described herein. In some instances, as a user interacts with a computing system through various hand signals, the hand of the user and pose of the hand (e.g., position and orientation) may be detected. To detect a hand, a point set may be analyzed to identify local extremum points (e.g., peaks and valleys) along an outer boundary of the point set. The local extremum points may then be used to identify a potential hand segment including one or more potential finger segments and/or a potential palm segment. When the potential hand segment satisfies one or more criteria, a hand may be detected. To detect a hand pose, an observed pose of the hand segment may be compared to one or more hand pose models.

25 Claims, 7 Drawing Sheets

(56) References Cited

OTHER PUBLICATIONS

Edelsbrunner, et al., "On the Shape of a Set of Points in the Plane", IEEE Transactions on Information Theory, vol. 29, No. 4, Jul. 1983, pp. 551-559.
Klasing, et al., "Comparison of Surface Normal Estimation Methods for Range Sensing Applications", Proceeding ICRA'09 Proceedings of the 2009 IEEE international conference on Robotics and Automation, 2009, 6 pgs.
Olsen, et al. "Multi-Scale Gradient Magnitude Watershed Segmentation", 9th International Conference, ICIAP 97, Florence, Italy, 1997, 8 pages.

* cited by examiner

HAND AND HAND POSE DETECTION

BACKGROUND

A large and growing population of people is enjoying entertainment through consumption of digital content items, such as music, movies, images, books, and so on. Many people today consume digital content through a wide variety of electronic devices. Among these electronic devices are cellular telephones, personal digital assistants (PDAs), electronic book readers, portable media players, tablets, netbooks, and the like. As more content is made available in digital form, people continue to consume more and more of this content. In addition, this population expects digital content to become more and more accessible and ubiquitous.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
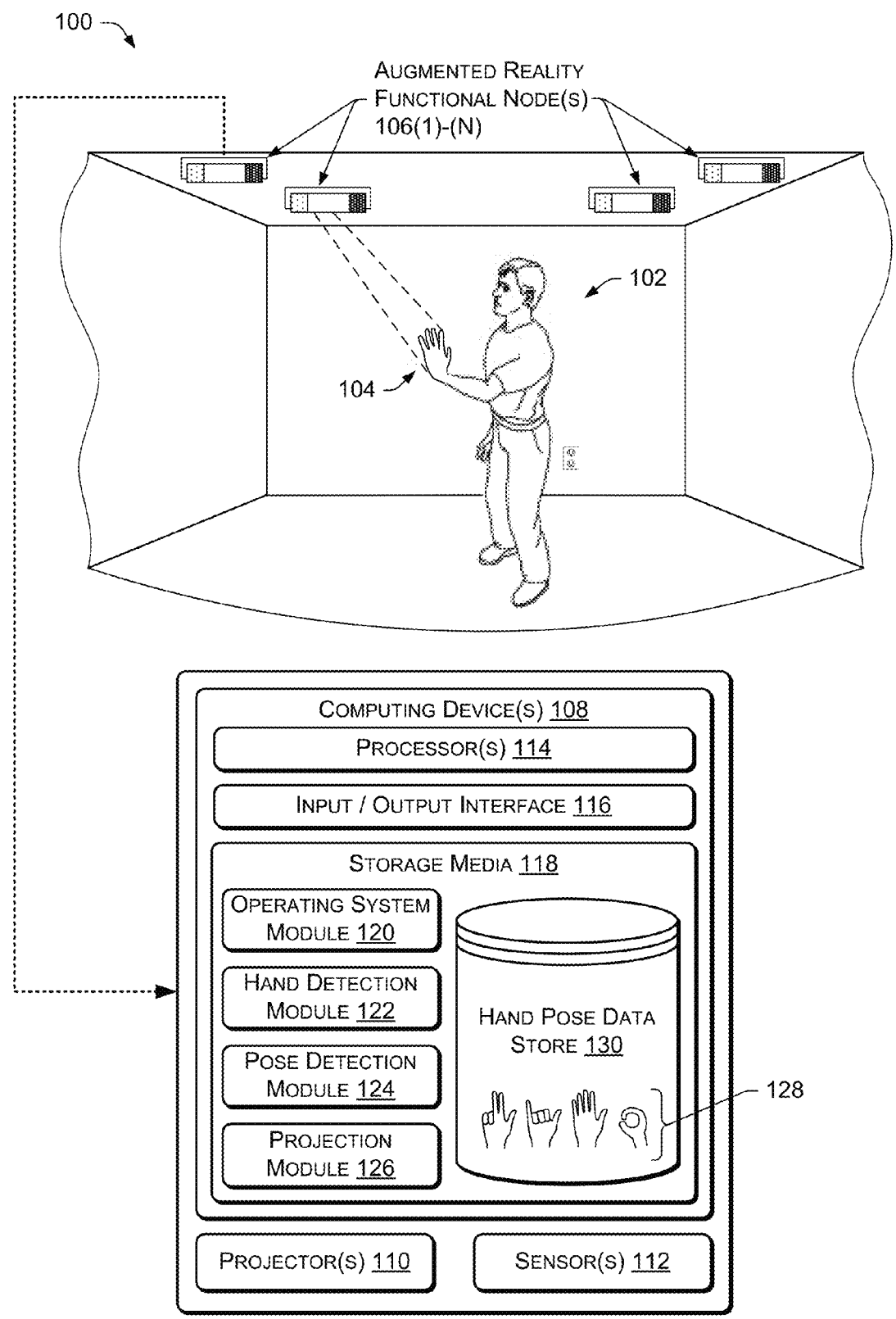
FIG. 1 illustrates an example environment that includes an augmented reality functional node (ARFN) configured detect a hand of a user within an environment and detect a pose of the hand.

This disclosure describes systems and techniques for detecting a hand of a user and a pose of the hand. In certain embodiments, a user may interact with an augmented reality functional node (ARFN) through various hand signals. The user may, for example, make a particular hand gesture in the air or on a surface to cause an act to be performed by the ARFN, such as controlling the output of projected content. As the user makes different hand signals, the hand of the user and pose of the hand (e.g., position and orientation) may be detected so that a correct act may be performed by the ARFN.

To detect a hand of a user and pose of the hand, a three-dimensional (3D) image, point set, or depth map of a scene containing the hand is obtained and segmented to produce 3D point sets or point clouds corresponding to different surfaces with the scene. The different surfaces and their 3D point sets are then evaluated to determine which of the surfaces includes a hand. For example, a point set may be analyzed to identify a contour or outer boundary including points of the point set lying on the outermost edges or periphery of the point set. The outer boundary may then be analyzed to determine local extremum points (e.g., peaks and valleys) comprising points that are associated with a particular curvature value. A curvature value of a point may comprise an angle formed from lines that extend from the point to adjacent points on the outer boundary. The local extremum points may then be used to identify one or more potential finger segments, a potential palm segment, and/or a potential wrist line of a hand.

A potential finger segment of the hand may be determined by, for example, identifying points of the point set along and within a boundary that extends from an initial local extremum point (e.g., a finger valley) to another local extremum point (e.g., a finger peak/tip), from the other local extremum point to a further local extremum point (e.g., a finger valley), and from the further extremum point back to the initial extremum point. Characteristics of the potential finger segment may then be analyzed to determine whether or not the segment at least partly represents a finger in a 3D dimensional space (e.g., the segment at least partly describes a shape of the finger). For instance, the potential finger segment may be analyzed to determine whether the potential finger segment has a length that is within a predetermined finger length range, has a width that is within a predetermined finger width range, or has particular curvature characteristics (e.g., the segment at least partly matches a cylinder model). When it is determined that the potential finger segment corresponds to a finger, the potential finger segment may be segmented from the point set.

The potential palm segment of the hand may be determined by identifying a shape model that fits within local extremum points (e.g., finger valleys) of the point set and boundary points of the point set that are not part of a potential finger segment. The points of the point set within and/or in proximity to the shape model may then be identified as the potential palm segment. The potential palm segment may be analyzed to determine if the potential palm segment corresponds to an actual palm. For instance, the potential palm segment may be analyzed to determine whether a length of the potential palm segment is within a predetermined palm length range, a width of the potential palm segment is within a predetermined palm width range, or a shape of the potential palm segment is a particular shape. When it is determined that the potential palm segment corresponds to a palm, the potential palm segment may be segmented from the point set.

The potential wrist line of the hand may be determined by extending a line from a first side of the hand (e.g., left side) through a wrist center to a second side of the hand (e.g., right side). The line may be substantially perpendicular to a line that passes through a center of the potential palm segment in a direction of the fingers. Characteristics of the potential wrist line may then be analyzed to determine whether or not the potential wrist line actually corresponds to a wrist line of a hand. For instance, the potential wrist line may be analyzed to determine whether the potential wrist line has a length that is within a predetermined wrist length range.

After analyzing the potential finger segment, potential palm segment, and/or potential wrist line, a determination may be made as to whether or not the point set is associated with a hand of a user. For instance, the point set may represent a hand when the potential finger segment corresponds to an actual finger, the potential palm segment corresponds to an actual palm, and/or the potential wrist line corresponds to an actual wrist line. When the hand is identified in the point set, the point set may be identified as corresponding to a hand segment. In some instances, the potential finger segment, potential palm segment, and/or potential wrist line may be segmented from the point set to form a hand segment. Alternatively, if the point set does not include a hand then the techniques discussed above may be repeated for another point set from the scene.

Upon determining that the point set represents a hand, the hand segment may be analyzed to determine a pose of the hand. For instance, an observed pose of the hand segment may be identified based on a pose of one or more finger segments and a pose of a palm segment. A pose of a finger segment may include an extended pose associated with a state in which a finger is extended, a half-folded pose associated with a state in which the finger is bent toward the a palm (e.g., forming a cupping shape), and a folded pose associated with a state in which the finger is bent to the palm (e.g., forming a fist). Thereafter, the observed pose of the hand may be compared to one or more hand pose models to identify a pose of the hand. In some instances, an act associated with the pose of the hand may be performed upon detecting the pose of the hand, such as controlling output of projected content. Alternatively, or additionally, the pose of the hand may be used for tracking the hand, projecting content onto the hand, and so on.

In some instance, the techniques described herein may allow a hand to be accurately detected in a point set. For instance, by determining whether a potential finger segment, potential palm segment, and/or a potential wrist line satisfy one or more criteria (e.g., predetermined hand dimensions), a hand may be detected when individual parts that form a hand (e.g., fingers, palm, and wrist) are detected. Further, by determining poses of individual parts of the hand, such as finger poses and a palm pose, a pose of the hand may be accurately detected.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

FIG. 1 illustrates an example environment 100 in which a user 102 utilizes a hand 104 to interact with one or more augmented reality functional nodes (ARFNs) 106(1), . . . , 106(N) (collectively referred to as "the ARFN 106" in some instances). It is to be appreciated that the techniques described herein may be performed by a single ARFN, by a collection of any number of ARFNs, or by any other devices or combinations of devices. In some instances, the user 102 may interact with the ARFN 106 to consume content that is projected onto a display medium. For example, through one or more hand signals the user 102 may control the ARFN 106 to project content onto a particular display medium in the environment 100. The display medium may include passive, non-powered, and/or handheld display medium, such as a blank card, sheet of paper, wall, table surface, user's hand, or other surface within the environment 100. In one example, the user 102 consumes content on a movable handheld display medium as the user moves in different ways through a room or other environment. The projected content may include electronic books, videos, images, interactive menus, or any other sort of visual and/or audible content.

In the example environment 100, the ARFN 106 is located in a ceiling of a room. However, the ARFN 106 may be located in other locations, such as on a table next to the user 102, in a wall, on a floor, and so on. Further, in some instances the ARFN 106 may be located in and/or integral with an object, such as a lamp, chair, and so on. Moreover, although the ARFN 106 is orientated in the environment 100 to project content and/or obtain an image from an elevated position with respect to the user 102, the ARFN 106 may alternatively, or additionally, be orientated differently, such as below the user 102 (e.g., rear projection).

As illustrated, the ARFN node 106 comprises a computing device(s) 108, a projector(s) 110, and a sensor(s) 112 (e.g., camera, ranging system, etc.). Some or the all of the computing device(s) 108 may reside within a housing of the ARFN node 106 or may reside at another location that is operatively connected to the ARFN node 106. The computing device(s) 108 comprises a processor(s) 114, an input/output interface 116, and storage media 118. The processor(s) 114 may be configured to execute instructions that may be stored in the storage media 118 or in other storage media accessible to the processor(s) 114.

The input/output interface 116, meanwhile, may be configured to couple the computing device(s) 108 to other components of the ARFN node 106, such as the projector(s) 110, the sensor(s) 112, other ARFN nodes (such as in other environments or in the environment 100), other computing devices, network communication devices (such as modems, routers, and wireless transmitters), and so forth. The coupling between the computing device(s) 108 and other devices may be via wire, fiber optic cable, wireless connection, or the like. The sensor(s) 112 may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, and pressure sensors. Other sensor types may be utilized without departing from the scope of the present disclosure.

The storage media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory, or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device(s) 108. The storage media 118 may reside within a housing of the ARFN 106, on one or more storage devices accessible on a local network, on cloud storage accessible via a wide area network, or in any other accessible location. As defined herein, CRSM does not include communication media, such as modulated data signals and carrier waves. As such, CRSM includes non-transitory media.

The storage media 118 may store several modules, such as instructions, data stores, and so forth that are configured to execute on the processor(s) 114. For instance, the storage media 118 may store an operating system module 120, a hand detection module 122, a pose detection module 124, and a projection module 126. The storage media 118 may also include other modules, which may be configured to implement various different functionality of the ARFN 106. The modules described herein are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The operating system module 120 may be configured to manage hardware and services within and coupled to the computing device(s) 108 for the benefit of other modules.

The hand detection module 122, meanwhile, may be configured to analyze and parse images captured by one or more cameras of the sensor(s) 112 to identify hand(s)/arm(s) of user(s). For example, the hand detection module 122 may analyze one or more point sets corresponding to different surfaces within the environment 100 to identify potential hand and arm segments. The potential hand segment may include different parts, such as one or more potential finger segments, a potential palm segment, and/or a potential wrist line. The hand detection module 122 may then analyze the one or more potential finger segments, potential palm segment, and/or potential wrist line to determine whether the segments and line satisfy one or more criteria (e.g., have average dimensions), and thus, correspond to actual parts of a hand. When the one or more potential finger segments, potential palm segment, and/or potential wrist line satisfy one or more criteria, the point set may be identified as representing a hand. In some instances, the hand detection module 122 then segments out the one or more potential finger segments and/or potential palm segment from the point set to form a hand segment, which may be composed of individual segments corresponding to one or more fingers and/or a palm. The hand segment may then be further analyzed, as discussed below.

The pose detection module 124 may analyze a hand segment to identify a pose of a hand. For example, the pose detection module 124 may identify an observed pose of the hand segment by identifying a pose of one or more finger segments and identifying a pose of a palm segment. Thereafter, the observed pose of the hand segment may be compared to one or more hand pose models 128 to identify a pose of the hand. The pose of the hand may correspond to a hand pose model that most closely matches the observed pose of the hand segment. A pose may indicate a position specified by linear measurements with respect to orthogonal 3D axes, such as X, Y, and Z, and/or may indicate an orientation specified by angular measurements around the 3D axes, such as by angles $\theta_x$, $\theta_y$, and $\theta_z$. Accordingly, in some instances the pose may be indicated or specified by a vector [X, Y, Z, $\theta_x$, $\theta_y$, $\theta_z$]. As illustrated the one or more hand pose models 128 may be stored in a hand pose data store 130. The pose of the hand may be used to determine an act that the ARFN 106 will perform, track the hand, estimate a trajectory of the hand, project content (e.g., onto the hand, on a display surface signaled by the hand, etc.), and so on.

The projection module 126 may manipulate projected content so that it appears correctly on a display medium. For example, the projection module 126 may vary the size, location, orientation, and/or aspect ratio of the projected image. The projection module 126 may also use techniques such as keystone correction to correct the appearance of the projected image in situations where the projection source is not aligned with the display medium. For example, the projected image may be intentionally distorted to account for a non-perpendicular alignment of the display medium with respect to the projection source. In some situations, the projected image may also be distorted to correct for irregularities or non-planar characteristics of the display medium 104.

Figure 2:
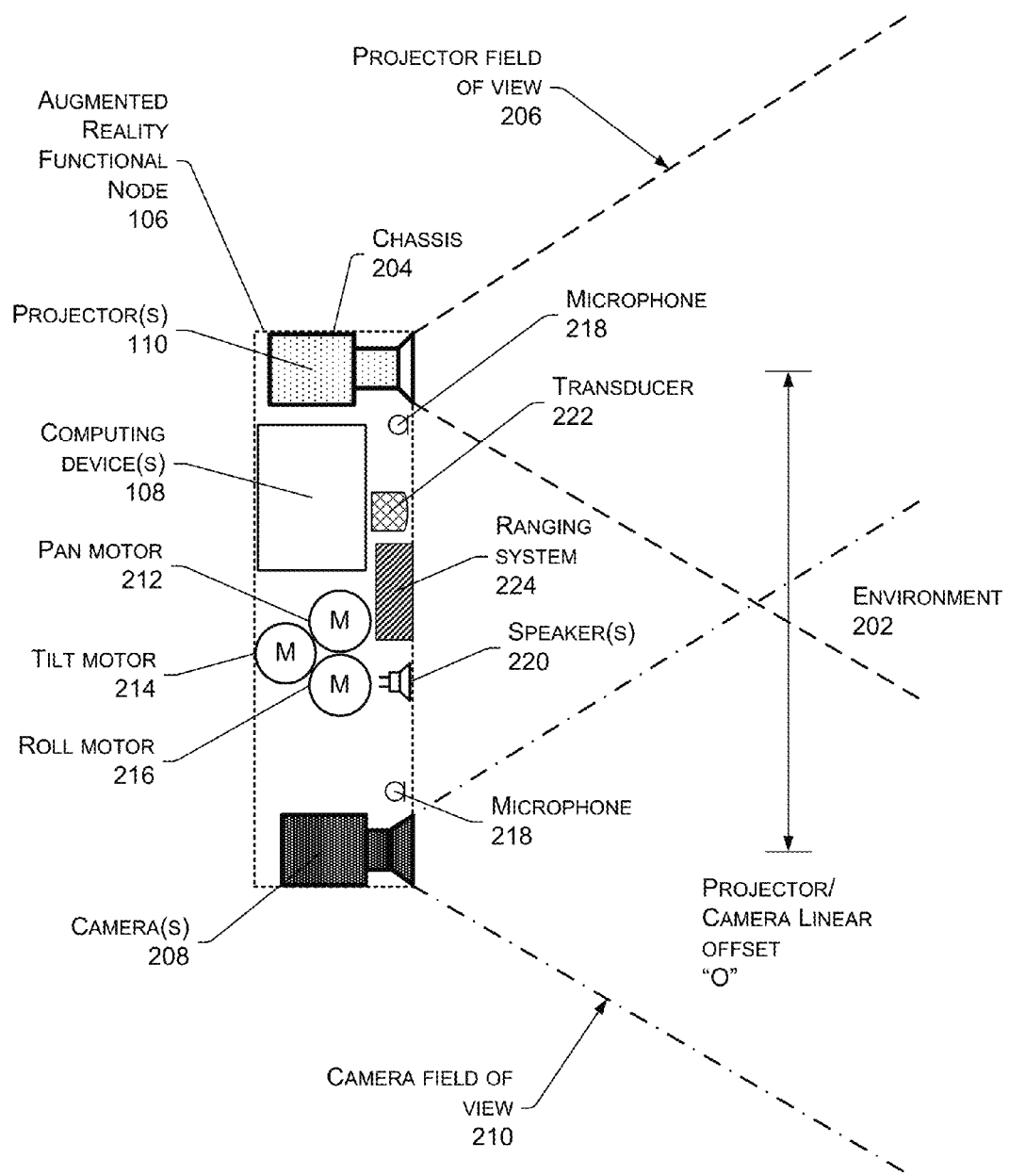
FIG. 2 shows additional details of the example ARFN of FIG. 1.

FIG. 2 shows additional details of the example ARFN 106 of FIG. 1. The ARFN node 106 is configured to scan at least a portion of an environment 202 and the objects therein to detect a hand of the user 102 and/or a pose of the hand. The ARFN node 106 may also be configured to provide augmented reality output, such as images, sounds, and so forth.

A chassis 204 holds the components of the ARFN node 106. The projector(s) 110 may be disposed within the chassis 204 and may be configured to generate and project light and/or images into the environment 202. These images may be visible light images perceptible to a user, visible light images imperceptible to the user, images with non-visible light, or a combination thereof. This projector(s) 110 may be implemented with any number of technologies capable of generating an image and projecting that image onto a surface within the environment 202. Suitable technologies include a digital micromirror device (DMD), liquid crystal on silicon display (LCOS), liquid crystal display, 3LCD, and so forth. The projector(s) 110 has a projector field of view 206 which describes a particular solid angle. The projector field of view 206 may vary according to changes in the configuration of the projector(s) 110. For example, the projector field of view 206 may narrow upon application of an optical zoom to the projector(s) 110.

A camera(s) 208 may also be disposed within the chassis 204. The camera(s) 208 is configured to image the environment 202 in visible light wavelengths, non-visible light wavelengths, or both. The camera(s) 208 has a camera field of view 210 that describes a particular solid angle. The camera field of view 210 may vary according to changes in the configuration of the camera(s) 208. For example, an optical zoom of the camera(s) 208 may narrow the camera field of view 210.

In some implementations, a plurality of cameras 208 may be used. For instance, one embodiment of the ARFN node 106 may include a three-dimensional (3D), infrared (IR) camera and a red-green-blue (RGB) camera. The 3D, IR camera may be configured to capture information for detecting depths of objects within the environment 202, while the RGB camera may be configured to detect edges of objects by identifying changes in color within the environment 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector(s) 110 and/or the camera(s) 208. For example, in one implementation the actuator may comprise a pan motor 212, a tilt motor 214, and so forth. The pan motor 212 is configured to rotate the chassis 204 in a yawing motion. The tilt motor 214, meanwhile, is configured to change the pitch of the chassis 204. In some instances, the ARFN 106 additionally or alternatively includes a roll motor 216, which allows the chassis 204 to move in a rolling motion. By panning, tilting, and/or rolling the chassis 204, different views of the environment 202 may be acquired.

One or more microphones 218 may be disposed within the chassis 204, or elsewhere within the environment 202. The one or more microphones 218 may be used to acquire input from an entity (e.g., a user), for echolocation, location determination of a sound, or to otherwise aid in the characterization of and receipt of input from the environment 202. In some instances, a user may use voice commands to control various aspects of the ARFN node 106. A speaker(s) 220 may also be present to provide audible output, such as the output from a text-to-speech module or playback from pre-recorded audio.

A transducer 222 may be present within the ARFN node 106, or elsewhere within the environment 202, and may be configured to detect and/or generate inaudible signals, such as infrasound or ultrasound. These inaudible signals may be used to provide for signaling between accessory devices and the ARFN node 106.

The ARFN node 106 may also include a ranging system 224. The ranging system 224 is configured to provide distance information from the ARFN node 106 to a scanned entity, object (e.g., display medium), or set of objects. The ranging system 224 may comprise and/or use radar, light detection and ranging (LIDAR), ultrasonic ranging, stereoscopic ranging, structured light analysis, time-of-flight observations (e.g., measuring time-of-flight round trip for pixels sensed at a camera), and so forth. In structured light analysis a projector may project a structured light pattern onto the scene within the environment 100, and a camera may capture an image of the reflected light pattern. Deformation in the reflected pattern, due to a lateral displacement between the projector and the camera, may be analyzed by the ARFN 106 to determine depths or distances corresponding to different points, areas, or pixels within the environment 100. In some implementations the transducer 222, the microphones 218, the speaker(s) 220, or a combination thereof may be configured to use echolocation or echo-ranging to determine distance and spatial characteristics of an entity or object.

In this illustration, the computing device(s) 108 is shown within the chassis 204. However, in other implementations all or a portion of the computing device(s) 108 may be disposed in another location and coupled to the ARFN node 106. This coupling may occur via wire, fiber optic cable, wirelessly, or a combination thereof. Furthermore, additional resources external to the ARFN node 106 may be accessed, such as resources in another ARFN node 106 accessible via a local area network, cloud resources accessible via a wide area network connection, or a combination thereof.

Also shown in this illustration is a projector/camera linear offset designated "O". This is a linear distance between the projector(s) 110 and the camera(s) 208. Placement of the projector(s) 110 and the camera(s) 208 at distance "O" from one another may aid in the recovery of structured or other light data from the environment. The known projector/camera linear offset "O" may also be used to calculate distances, dimensioning, and otherwise aid in the characterization of entities or objects within the environment 202. In other implementations the relative angle and size of the projector field of view 206 and camera field of view 210 may vary. Also, the angle of the projector(s) 110 and the camera(s) 208 relative to the chassis 204 may vary.

In other implementations, the components of the ARFN node 106 may be distributed in one or more locations within the environment 100. As mentioned above, the microphones 218 and the speaker(s) 220 may be distributed throughout the environment. The projector(s) 110 and the camera(s) 208 may also be located in separate chassis 204. The ARFN node 106 may also include discrete portable signaling devices used by entities to issue command attention inputs. For example, these may be acoustic clickers (audible or ultrasonic), electronic signaling devices such as infrared emitters, radio transmitters, and so forth.

The ARFN node 106 is shown in FIG. 2 with various sensors, but other sensors may be located either within or external to the chassis 204. The sensors may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, pressure sensors, and so forth.

Figure 3:
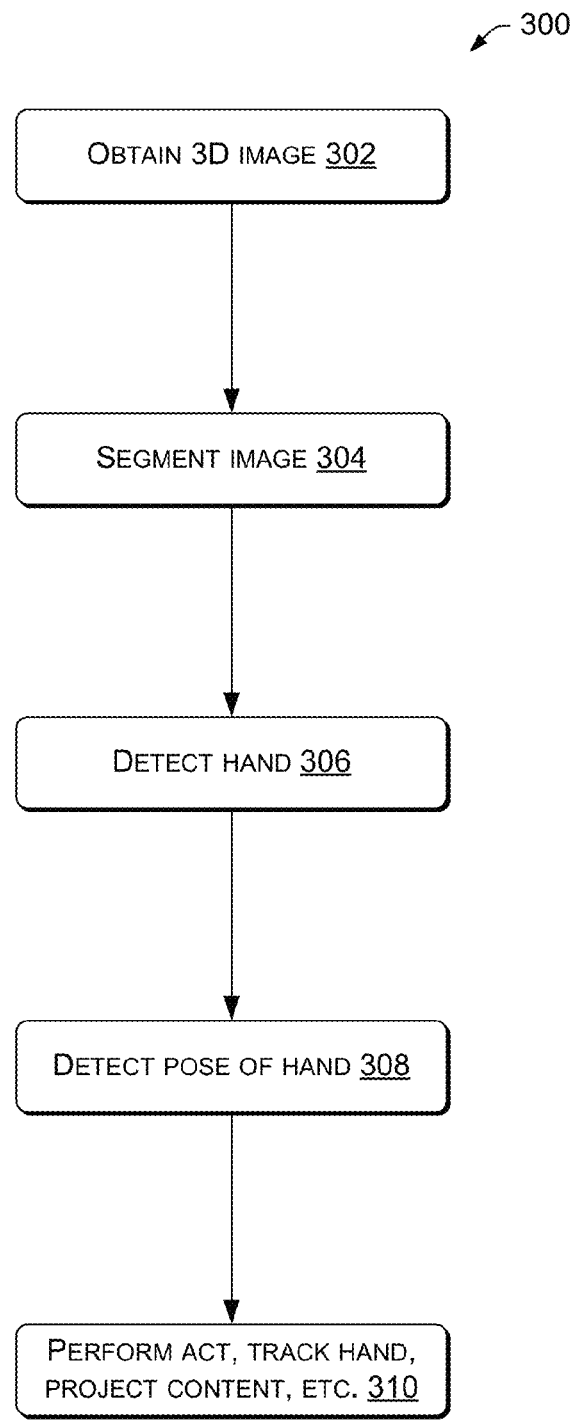
FIG. 3 illustrates an example process of detecting a hand of a user within a point set, detecting a pose of the hand, and using the pose of the hand and/or a hand segment.

FIG. 3 illustrates an example process 300 of detecting a hand of a user within a point set, detecting a pose of the hand, and using the pose of the hand and/or a hand segment. The process 300 is described in reference to the environment 100 of FIG. 1, however various aspects of the process 300 may be utilized in different environments, using different components.

At 302, the ARFN 106 may obtain a 3D image of the environment 100. The 3D image may comprise a depth map or 3D point cloud obtained, calculated, or reconstructed by the ARFN 106 in conjunction with the projector(s) 110 and the sensor(s) 112 (e.g., camera, ranging system, etc.). For example, the ARFN 106 may utilize structured light analysis to determine the distance of surface points viewed by a camera. Specifically, the projector(s) 110 may project a structured light pattern onto the scene within the environment 100, and the camera may capture an image of the reflected light pattern. Deformation in the reflected pattern, due to a lateral displacement between the projector(s) 110 and the camera, may be analyzed by the ARFN 106 to determine depths or distances corresponding to different points, areas, or pixels within the environment 100. Other types of systems may alternatively be utilized to obtain a 3D image of the environment, such as techniques involving time-of-flight observations.

At 304, the ARFN 106 may segment the 3D image to generate multiple 3D point sets corresponding to different surfaces within the 3D image. Segmenting may be performed using surface normals that represent the orientation of local surfaces in a 3D point set (K. Klasing, D. Althoff, D. Wollherr, and M. Buss: Comparison of Surface Normal Estimation Methods for Range Sensing Applications, Proc of IEEE ICRA 09). Initial segmentation may be performed in the surface normal domain. Surfaces containing smoothly varying surface normals may be clustered by various techniques. For example, an algorithm known as the watershed transformation may be used for initial segmentation (Olsen, O. and Nielsen, M.: Multi-Scale Gradient Magnitude Watershed Segmentation, Proc. of ICIAP 97). Further processing, including merging and splitting identified segments, may be performed in different embodiments. For planar surface segmentation, a segment resulting from surface normal clustering may be processed by a plane estimation routine such as random sample consensus (RANSAC) plane estimation. Surfaces with similar plane equations may be merged into one segment, or split vice versa. In some instances, at 304 the ARFN 106 may filter out 3D point sets that to do not satisfy one or more criteria. For example, 3D point sets which do not have particular dimensions corresponding to hand dimensions may be filtered out. To illustrate, a 3D point set corresponding to a relatively large surface (e.g., in comparison to an average hand surface) may be filtered out after this surface has been identified at 304.

At 306, the ARFN 106 may detect a hand within a particular point set from the multiple point sets generated at 304. For example, a point set may be analyzed to identify one or more potential finger segments, a potential palm segments, and/or a potential wrist line of a hand. The AFRN 106 may then determine whether the one or more potential finger segments, potential palm segment, and/or potential wrist line satisfy one or more criteria and correspond to one or more fingers, a palm, and/or a wrist of a hand. When the one or more criteria are satisfied, the point set may be identified as corresponding to a hand segment. The operation 306 will be described in further detail below with reference to FIGS. 4A-4B.

At 308, the ARFN 106 may analyze the hand segment from the operation 306 to detect a pose of a hand of a user. The pose of the hand may be detected by identifying an observed pose of the hand segment and comparing the observed pose to one or more hand pose models. The ARFN 106 may then identify a pose of the hand from a hand pose model that most closely matches the observed pose of the hand segment. The operation 308 will be described in further detail below with reference to FIG. 5.

At 310, the ARFN 106 may use the hand segment and/or a pose of the hand segment to perform an act, track the hand, project content (e.g., onto the hand), and so on. For example, upon determining that a hand is in a particular pose (e.g., has a particular position and orientation), the ARFN 106 may perform an act that is associated with the particular pose, such as stopping the output of content, beginning the output of content, switching to different content, scrolling through content, and so on. In some instances, the act may be performed upon detecting a particular series of hand poses that comprise a gesture (e.g., hand movement). Further, the hand segment and/or pose of the hand may be used to track the hand as a user moves from room to room or throughout an environment. Alternatively, or additionally, the hand segment and/or pose may be used to project content onto the hand. Here, the hand segment and/or pose may define the boundaries for projecting the content and/or how the content should be projected (e.g., an angle at which to project, etc.).

Figure 4A:
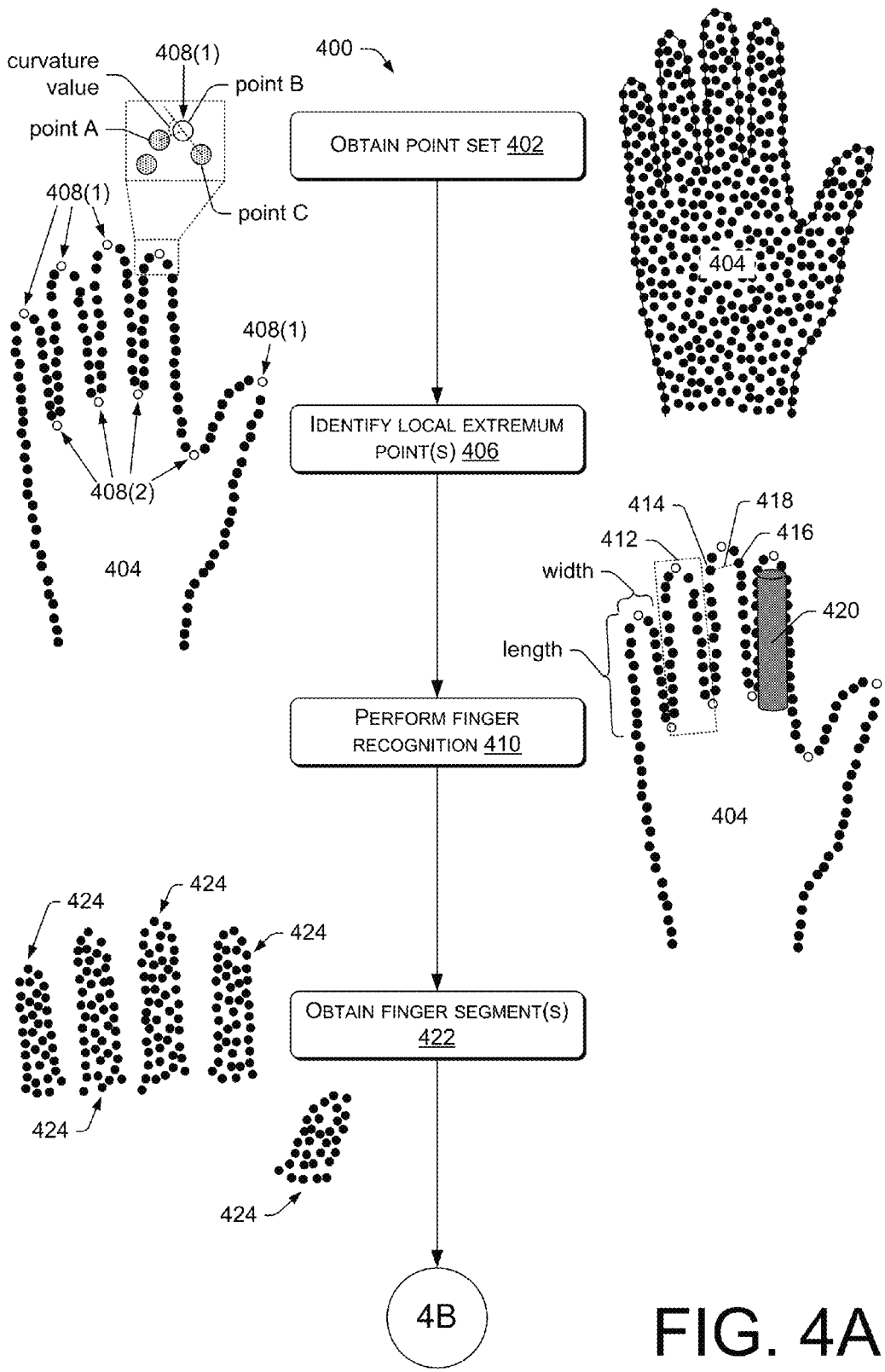
FIGS. 4A-4B illustrate an example process of detecting a hand of a user within a point set.
Figure 4B:
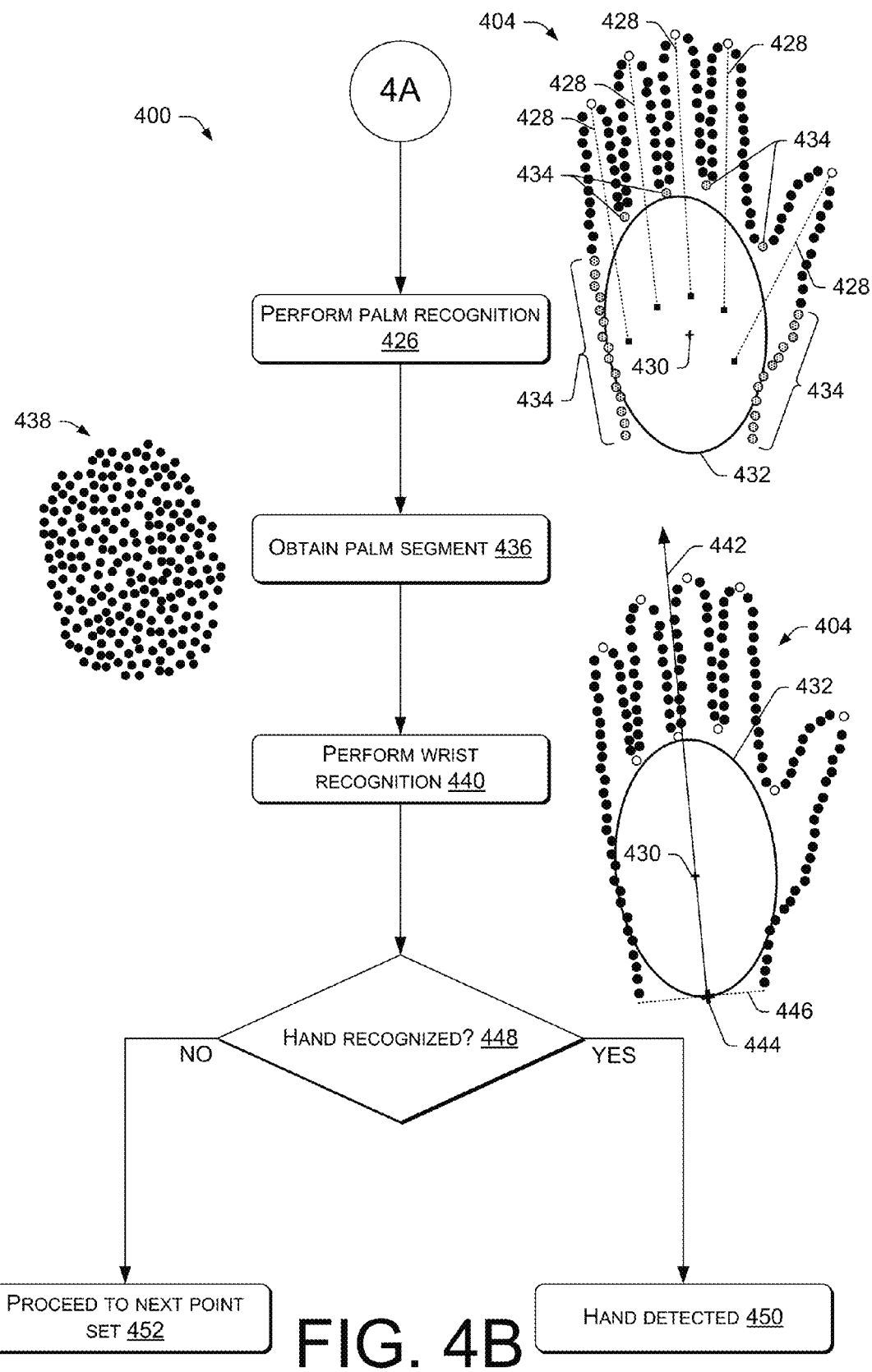

FIGS. 4A-4B illustrate an example process 400 of detecting a hand of a user within a point set. That is, the process 400 may determine whether or not a particular point set describes a hand of a user. In some instances, the process 400 may also segment points of the point set that correspond to parts of the hand, such as fingers and a palm. The process 400 may be performed at the operation 306 of FIG. 3. The process 400 is described in reference to the environment 100 of FIG. 1, however various aspects of the process 400 may be utilized in different environments, using different components.

In FIG. 4A, at 402, the ARFN 106 may obtain a point set 404 from an imaging sensor or other device. The point set 404 may comprise a point set from the multiple point sets generated at 304 in FIG. 3. As noted above, the point set 404 may correspond to a surface within the environment 100. At 402, the ARFN 106 may identify a contour or outer boundary comprising points of the point set 404 lying on the outermost edges or periphery of the point set 404. To calculate or construct the contour, an intensity threshold may be applied to points of the point set 404 to create a binary image (which may in turn be smoothed or otherwise filtered). Boundary or edge points may be identified using various available techniques (H. Edelsbrunner, D. Kirkpatrick, and R. Seidel: On the Shape of a Set of Points in the Plane, IEEE Transactions on Information Theory, July, 1983). For illustrative purposes, the point set 404 of FIG. 4 is illustrated with a line along the outer boundary to indicate that the point set 404 in this example corresponds to a hand of a user.

At 406, the ARFN 106 may identify one or more local extremum points 408. Each point of the one or more local extremum points 408 may comprise a point along an outer boundary of the point set 404 that is associated with a curvature value that satisfies one or more curvature criteria. As discussed in further detail below, the one or more curvature criteria may be satisfied when an angle formed by connecting a line between three or more adjacent points is within a predetermined range. The one or more local extremum points 408 may correspond to finger peaks (e.g., tips of fingers) and finger valleys (e.g., connection points between fingers). For ease of illustration, the points within the outer boundary of the point set 404 are not illustrated.

To identify a local extremum point, the ARFN 106 may calculate a curvature value for each point along the outer boundary of the point set 404. A curvature value may be calculated by identifying an angle between lines formed from adjacent points of the outer boundary of the point set 404. For example, as illustrated in FIG. 4A, a line may be formed from a center of a point A to a center of a point B, while another line may be formed from a center of a point C through the center of the point B. The curvature value of point B may correspond to the angle formed from these lines. Although the curvature value in this example corresponds to an outer angle (e.g., roughly 80 degrees) between point A and point B, the curvature value may alternatively correspond to an inner angle (e.g., roughly 100 degrees) between point A and point C.

A local extremum point may then be identified by determining whether a curvature value of a point along the outer boundary of the point set 404 satisfies one or more curvature criteria (e.g., is within a predetermined range). For example, when a curvature value of a point is between 0 and 90 degrees, the point may correspond to a local maximum point (e.g., finger tip). Alternatively, when a curvature value of a point is between 0 and −90 degrees (e.g., between 270 and 360 degrees), the point may correspond to a local minimum point. As illustrated in FIG. 4A, the local extremum points 408(1) correspond to local maximum points (e.g., finger peaks) and the local extremum points 408(2) correspond to local minimum points (e.g., finger valleys).

At 410, the ARFN 106 may perform finger recognition to determine whether or not the point set 404 includes points that describe one or more fingers of a hand. To make the determination, the ARFN 106 may identify one or more potential finger segments comprising points from the point set 404 that are defined, at least in part, by the one or more local extremum points 408. For example, a potential finger segment may include points of the point set 404 along and within a boundary/contour that extends from an initial local extremum point (e.g., a finger valley) along the outer boundary of the point set to another local extremum point (e.g., a finger peak/tip), from the other local extremum point along the outer boundary to a further local extremum point (e.g., a finger valley), and from the further extremum point back to the initial local extremum point. Alternatively, in some instances (e.g., in the case of a little finger (pinky) or thumb finger where only one valley may exist), a potential finger segment may include those points along and within a boundary that extends from an initial local extremum point (e.g., finger tip) to another local extremum point (e.g., finger valley), from the other local extremum point to a point on the outer boundary that is substantially equal distance to the initial local extremum point as the other local extremum point (e.g., a point that is located on an opposite side of the finger in comparison to a finger valley and that is equal distance to a finger tip as the finger valley). The points of the potential finger segment are likely to represent a finger. As illustrated, the points within a box 412, including two local minimum points and a local maximum point, are part of a potential finger segment for the "ring finger" of the point set 404. For ease of illustration, the points within the outer boundary of the potential finger segment are not illustrated. In the example of FIG. 4A, the ARFN 106 determines that the point set 404 includes five potential finger segments corresponding to the five fingers of the hand.

The one or more potential finger segments may then be analyzed to determine whether or not each of the one or more potential finger segments satisfy one or more finger criteria, and thus, correspond to actual fingers. The one or more finger criteria may be based on predetermined average finger characteristics for a plurality of users, such as average dimensions, etc. The one or more potential finger segments may satisfy the one or more finger criteria when, for example:

- A length of a potential finger segment satisfies one or more predetermined finger lengths (e.g., the length of the potential finger segment is within a predetermined average finger length range).
- A width of a potential finger segment satisfies one or more predetermined finger widths (e.g., the width of the potential finger segment is within a predetermined average finger width range). In some instances, multiple pairs of points may be used to determine the width of the potential finger segment. For example, the ARFN 106 may select a point 414 along an outer boundary of the point set 404 on a left side of a local maximum point and a point 416 along the outer boundary on a right side of the local maximum point that is a same distance from the local maximum point as the point 414. The ARFN 106 may then estimate the width of the potential finger segment from a length of a straight line 418 between the point 414 and the point 416. This process may be repeated for different pairs of points of the potential finger segment. The width of the potential finger segment may be within the predetermined average finger width range when lengths between a particular number of point pairs is within the predetermined average finger width range.
- A potential finger segment includes one or more particular curvature characteristics. For example, a potential finger segment may satisfy the particular curvature characteristics when the potential finger segment is cylindrically shaped. Here, the potential finger segment may be compared to a 3D cylinder model 420 to determine if points of the potential finger segment (e.g., point along and within the outer boundary) have curvature values that correspond to curvature values of the cylinder model 420. The comparison may generally determine if points of a potential finger segment are cylindrically shaped or curved from one side of a potential finger segment (e.g., left side of a segment) to another side of the potential finger segment (e.g., right side of the segment). Alternatively, or additionally, the particular curvature characteristics may be satisfied when curvature values of points along the outer boundary of a potential finger segment indicate that the potential finger segment has a substantially straight portion (e.g., around zero degrees), a peak potion (e.g., around 90 degrees), and another straight portion in that order. This may indicate that the outline of the potential finger segment includes a flat side, a finger tip, and another flat side.
- A quantity of the one or more potential finger segments satisfies one or more predetermined quantities (e.g., is within a predetermined finger number range of one to five fingers).
- Local extremum points associated with the one or more potential finger segments have a particular relation to each other. For example, the one or more criteria may be satisfied when the local extremum points are located at or within a predetermined distance to each other (e.g., a local maximum point (finger peak) is relatively close to a local minimum point (finger valley)), when the local extremum points are associated with a particular order along the outer boundary of the point set 404 (e.g., local minimum point, local maximum point, local minimum point), when the local extremum points are positioned in a manner that would indicate a finger (e.g., a local minimum point being positioned to the right of a neighboring local maximum point may indicate a finger, while a local minimum point being positioned directly below the local maximum point may not), and so on. This may allow the ARFN 106 to determine whether the local extremum points actually correspond to finger peaks and/or valleys.

When a predetermined number of the one or more potential finger segments satisfy the one or more finger criteria and/or when a predetermined percentage of the one or more finger criteria are satisfied, the ARFN 106 may determine that the one or more potential finger segments correspond to one or more fingers of a hand. In the example of FIG. 4A, the point set 404 includes five potential finger segments that correspond to five different fingers.

After determining that the one or more potential finger segments correspond to one or more fingers, at 422 the ARFN 106 may obtain one or more finger segments 424 by segmenting points from the point set 404 corresponding to the one or more potential finger segments. For example, the "ring finger" segment 424 may comprise points of the point set 404 that are associated with the potential finger illustrated within the box 412 (including points that are not illustrated within the boundary). Alternatively, when the one or more potential finger segments do not correspond to one or more fingers, the operation 422 may not be performed.

In FIG. 4B, at 426 the ARFN 106 may perform palm recognition to determine whether or not the point set 404 includes points that describe a palm of a hand. In general, the ARFN 106 may (i) determine a shape model that fits within local minimum points (e.g., finger valleys) of the point set 404 and boundary points of the point set 404 that are not part of the potential finger segments, (ii) identify points of the point set 404 that are within the shape model and/or are within a predetermined proximity to the shape model as a potential palm segment, and (iii) analyze the potential palm segment to determine if the potential palm segment corresponds to an actual palm.

In particular implementations, to make the determination at 426, the ARFN 106 may form lines 428 that extend from local extremum points (e.g., local maximum points) associated with the potential finger segments through center lines of the potential finger segments. Each of the lines 428 may have an end (illustrated by a square point) and have a length that is based at least in part on a length of the associated potential finger segment (e.g., a multiple of the length of the potential finger segment, such as two or one and a half times the length). The ARFN 106 may then determine a centroid 430 of a shape that is formed from the ends of the lines 428. As illustrated, the centroid 430 is located in a center of the ends of the lines 428 (e.g., a shape formed by connecting lines between the ends of the lines 428).

Thereafter, the ARFN 106 may determine a shape model 432 that fits within points 434 (points illustrated in stippling) while being centered on the centroid 430. The points 434 correspond to points of the point set 404 representing finger valleys (e.g., points 408(2)) and boundary points of the point set 404 that are not part of a potential finger segment. For example, the ARFN 106 may determine the shape model 432 that substantially encompasses points bounded by the points 434 while the shape model 432 is centered on the centroid 430. In one example, the AFN 106 iterates through shape models comprising an ellipse, circle, quadrilateral, pentagon, and so on, while adjusting a size of the shape models, to determine a shape model that most closely matches the points defined by the points 434. The ARFN 106 may then identifying a potential palm segment as the points of the point set 404 that are within the shape model 432 and/or are within a predetermined proximity (e.g., predetermined distance) to the shape model 432. The potential palm segment may include points of the point set 404 that are bordered by the one or more potential finger segments.

The potential palm segment may then be analyzed to determine whether or not the potential palm segment satisfies one or more palm criteria, and thus, corresponds to an actual a palm. The one or more palm criteria may be based on predetermined average palm characteristics for a plurality of users, such as average dimensions, etc. The potential palm segment may satisfy the one or more palm criteria when, for example:

- A length of the potential palm segment satisfies one or more predetermined palm lengths (e.g., is within a predetermined palm length range).
- A width of the potential palm segment satisfies one or more predetermined palm widths (e.g., is within a predetermined palm width range).
- A shape (e.g., raw shape) of the potential palm segment is a shape that would be expected as corresponding to a palm, such as a circle or an ellipse with eccentricity below a particular level. For example, if a shape of the potential palm segment is an ellipse with eccentricity of 0.7, this may indicate the potential palm segment represents a palm, whereas if the shape is an ellipse with eccentricity of 0.9, this may indicate that the potential palm segment does not represent a palm. In another example, if the shape of the potential palm segment is a rectangle that has particular characteristics, such as different sides being particular lengths, this may indicate that the potential palm segment represents a palm.
- Distances from the centroid 430 to the local minimum points (e.g., the points 408(2)) are within a particular range.

When a predetermined percentage of the one or more palm criteria are satisfied, the ARFN 106 may determine that the potential palm segment corresponds to a palm. The ARFN 106, at 436, may then obtain a palm segment 438 by segmenting points from the point set 404 corresponding to the potential palm segment. Alternatively, when the predetermined percentage of the one or more palm criteria are not satisfied, the operation 436 may not be performed.

At 440, the ARFN 106 may perform wrist recognition to determine whether or not the point set 404 includes a wrist line. To make the determination, the ARFN 106 may utilize Principal Component Analysis (PCA) to estimate a direction of the potential hand segment (e.g., a direction that the one or more potential finger segmenting are pointing). This estimate may result in forming a line 442 that passes substantially through a center of the potential hand segment, such as through the centroid 430, in a direction that the one or more potential finger segments are pointing. The ARFN 106 may then identify a wrist center 444 from an intersection of the line 442 and the shape model 432, at the lower side of the shape model 432. A potential wrist line 446 may then be estimated by extend a line through the wrist center 444 and perpendicular to the line 442. As illustrated, the potential wrist line 446 extends from a first side of the point set 404 that describes, a left side of the hand to a second side of the point set 404 that describes a right side of the hand.

The potential wrist line 446 may then be analyzed to determine whether or not a length of the potential wrist line 446 satisfies one or more wrist criteria (e.g., satisfies one or more predetermined wrist lengths). The one or more wrist criteria may be satisfied when the potential wrist line 426 is within a predetermined wrist length range (e.g., average wrist length range), and thus, corresponds to an actual wrist line of a hand.

At 448, the ARFN 106 may determine whether or not the point set 404 corresponds to a hand (e.g., whether or not a hand is recognized). For example, when the one or more potential finger segments satisfy the one or more finger criteria, the potential palm segment satisfies the one or more palm criteria, and/or the potential wrist line 446 satisfy the one or more wrist criteria (e.g., finger, palm, and/or wrist line are detected), the ARFN 106 may determine that the point set 404 corresponds to a hand at 450. In other words, a hand may be detected in the point set 404. Alternatively, when one or more of the above noted criteria are not satisfied for one or more of the parts of the hand (e.g., finger, palm, and wrist), the ARFN 106 may proceed to perform the process 400 for a next point set at 452. By doing so, the ARFN 106 may determine the point sets that describe a hand of a user.

Figure 5:
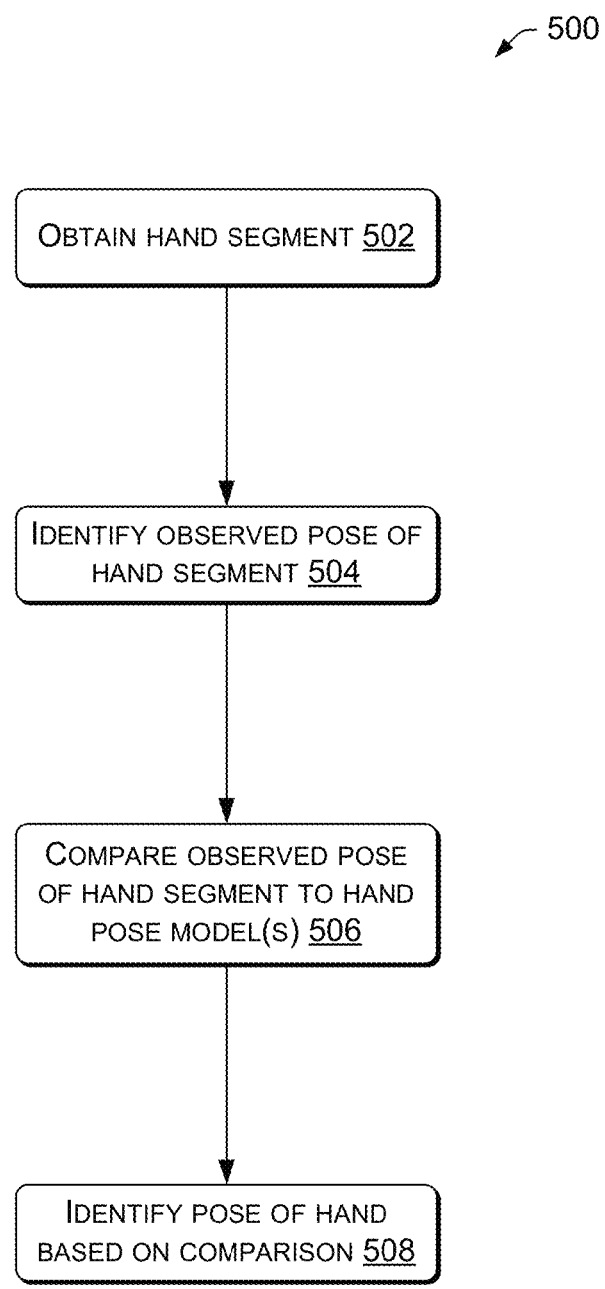
FIG. 5 illustrates an example process of detecting a pose of a hand.

FIG. 5 illustrates an example process 500 of detecting a pose of a hand. That is, the process 500 may determine a position and/or orientation of the hand. When the pose is associated with a particular act, the ARFN 106 may perform the act upon recognizing the pose. The process 500 may be performed at the operation 308 of FIG. 3. The process 500 is described in reference to the environment 100 of FIG. 1, however various aspects of the process 500 may be utilized in different environments, using different components.

At 502, the ARFN 106 may obtain a hand segment comprising a point set that describes, at least in part, a hand of a user. In some instances, at least some of the points of the point set correspond to one or more finger segments (e.g., finger segments 424 of FIG. 4A) and at least some of the points of the point set corresponding to a palm segment (e.g., palm segment 438 of FIG. 4B).

At 504, the ARFN 106 may identify an observed pose of the hand segment obtained at the operation 502. The observed pose may be obtained by identifying poses of the different segments of the hand segment (e.g., finger segments and palm segment). For instance, the ARFN 106 may determine a finger pose for each individual finger segment of the hand segment. A finger pose may comprise an extended pose associated with a state in which a finger of the user is extended, a half-folded pose associated with a state in which the finger is bent toward the a palm and a distance between a tip of the finger and the palm is greater than a predetermined distance, and a folded pose associated with a state in which the finger is bent toward the palm and a distance between a tip of the finger and the palm is less than the predetermined distance. Further details of finger poses will be discussed below in reference to FIGS. 6A-6C. As noted above, the ARFN 106 may also determine a pose of the palm.

At 506, the ARFN 106 may compare the observed pose of the hand segment identified at the operation 504 to one or more hand pose models. The hand pose models may comprise, for example:

- A hand pose model associated with all fingers being extended, half-folded, or folded. For example, the hand pose model may be associated with all fingers being folded to the palm to make a fist, all fingers being half-folded to make a "O" shape, or all fingers being extended. In some instances, there may be separate models for the fingers contacting each other and the fingers being separated.

A model associated with a particular number of fingers being extended and the other fingers being folded to the palm (e.g., index finger and middle fingers extended with the other fingers being folded into the palm, index finger and little finger extended with the other fingers being folded into the palm, index finger and middle finger extended with the other fingers being folded into the palm).

A hand pose model associated with a particular number of fingers being half-folded and the other fingers extended or folded.

Although a few example hand pose models have been described, it should be appreciated that any number of hand pose models may be used.

Upon comparing the observed pose of the hand segment to the one or more hand pose models, at 508 the ARFN 106 may determine a pose of the hand by identifying a hand pose model that most closely matches the observed pose of the hand segment.

The processes 300, 400, and 500 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 6A:
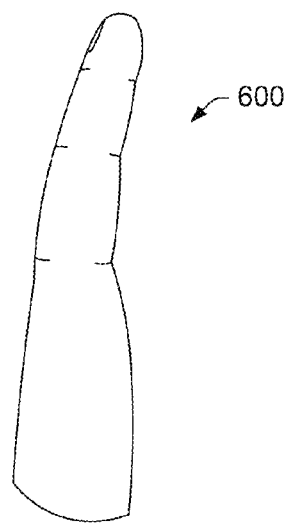
FIGS. 6A-6C illustrate example finger poses that may be identified for a finger
Figure 6B:
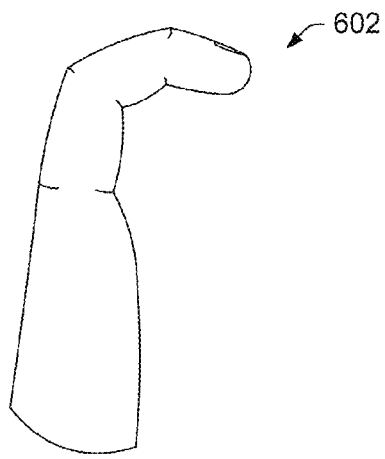
Figure 6C:
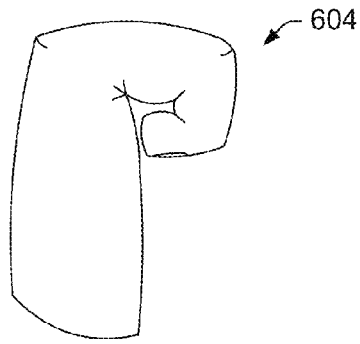

FIGS. 6A-6C illustrate example finger poses that may be identified for a finger when, for example, a hand segment pose is being identified. FIGS. 6A-6C illustrate the three segments of a finger (upper sections of figures) and a palm segment of a hand (lower section of figures). FIG. 6A illustrates an extended pose associated with a state in which the finger is extended. In this example, the finger is fully extended, although in other examples the finger may have some amount of curvature below a particular threshold.

FIG. 6B illustrates a half-folded pose 602 associated with a state in which the finger is bent toward the palm and a distance between a tip of the finger and the palm is greater than a predetermined distance. In this example, the finger may be in a position to grasp an object, such as a ball.

Meanwhile, FIG. 6C illustrates a folded pose 604 associated with a state in which the finger is bent toward the palm and a distance between a tip of the finger and the palm is less than the predetermined distance. In some instances, the finger may be contacting the palm of the hand, while in other instances the finger may be relatively close to the palm.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:
   one or more processors;
   an imaging sensor; and
   one or more computer-readable media storing computer-executable instructions that, when executed by the one or more processors, cause the one or more processors to perform acts comprising:
   obtaining a point set using the imaging sensor;
   identifying a first local extremum point from the point set along a first portion of an outer boundary of the point set, the first portion associated with a first curvature value that satisfies one or more curvature criteria;
   identifying a second local extremum point from the point set along a second portion of the outer boundary of the point set, the second portion associated with a second curvature value that satisfies the one or more curvature criteria;
   identifying a potential hand segment within the point set;
   identifying a first line segment from the point set, the first line segment extending from the first local extremum point and terminating at a first endpoint, the first endpoint different than the second local extremum point;
   identifying a second line segment from the point set, the second line segment extending from the second local extremum point and terminating at a second endpoint, the first endpoint different than the second endpoint, and the second endpoint different than the first local extremum point;
   identifying a centroid of a shape within the point set, the centroid based at least in part on the first endpoint and the second endpoint;
   applying a shape model to the potential hand segment based at least in part on a location of the centroid;
   determining that the potential hand segment is a potential palm segment based at least in part on the shape model and the location of the centroid;
   designating the point set as corresponding to a hand of a user; and
   comparing the potential hand segment to one or more hand pose models to identify a pose of the hand of the user.

2. The system of claim 1, wherein the identifying the potential hand segment includes:
   identifying one or more potential finger segments, a potential finger segment of the one or more potential finger segments including points of the point set along and within a contour that extends from the first local extremum point to a third local extremum point, from the third local extremum point to a particular point along the outer boundary of the point set, and from the particular point to the first local extremum point; and
   determining that the potential palm segment comprises points of the point set that are at least partly bordered by the one or more potential finger segments.

3. The system of claim 2, the acts further comprising determining that at least one of: a length of at least one potential finger segment of the one or more potential finger segments satisfies one or more predetermined finger lengths, a width of the at least one potential finger segment satisfies one or more predetermined finger widths, the at least one potential finger segment includes a particular curvature characteristic, or a quantity of the one or more potential finger segments satisfies one or more predetermined finger quantities.

4. The system of claim 1, wherein the determining that the potential hand segment is the potential palm segment comprises determining that at least one of: a length of the potential palm segment satisfies one or more predetermined palm lengths, a width of the potential palm segment satisfies one or more predetermined palm widths, or a shape of the potential palm segment satisfies one or more predetermined shapes.

5. A system comprising:
one or more processors; and
one or more computer-readable media storing computer-executable instructions that, when executed, cause the one or more processors to perform acts comprising:
obtaining a point set;
identifying a local extremum point along an outer boundary of the point set that has a curvature value that satisfies one or more curvature criteria;
identifying a potential finger segment of one or more potential finger segments comprising points from the point set that are based at least in part on the local extremum point, the local extremum point representing a distal portion of the potential finger segment;
determining that the potential finger segment has a length that satisfies a predetermined finger length;
determining that the potential finger segment has a width that satisfies a predetermined finger width;
determining that the potential finger segment has a centerline;
identifying a line segment from the point set based at least in part on the centerline, the line segment extending from the local extremum point of the potential finger segment and terminating at an endpoint;
identifying a centroid of a shape within the point set, the centroid based at least in part on the endpoint of the line segment, wherein the centroid is different than the endpoint;
identifying a potential palm segment based at least in part on a location of the centroid; and
determining that the point set represents, at least in part, a hand of a user.

6. The system of claim 5, the acts further comprising determining that the potential finger segment includes a particular curvature characteristic, or a quantity of the one or more potential finger segments satisfies one or more predetermined finger quantities.

7. The system of claim 5, wherein the local extremum point is one of a plurality of local extremum points, the acts further comprising determining that a point of the plurality of local extremum points is located within a predetermined distance to another point of the plurality of local extremum points.

8. The system of claim 5, the acts further comprising:
determining that the potential palm segment satisfies one or more palm criteria;
and wherein determining that the point set represents the hand of the user is based at least in part on determining that the potential palm segment satisfies the one or more palm criteria.

9. The system of claim 8, wherein determining that the potential palm segment satisfies the one or more palm criteria comprises determining that at least one of: a length of the potential palm segment satisfies one or more predetermined palm lengths, a width of the potential palm segment satisfies one or more predetermined palm widths, or a shape of the potential palm segment satisfies one or more predetermined shapes.

10. The system of claim 5, wherein the potential palm segment is identified by aligning a shape model to the point set by aligning the shape model to be substantially centered on the centroid, the potential palm segment comprising points of the point set that are within the aligned shape model or are within a predetermined distance of the aligned shape model.

11. The system of claim 5, the acts further comprising:
identifying a line that extends through the centroid in a direction that the one or more potential finger segments are pointing;
identifying a potential wrist line that extends from a first side of the point set to a second side of the point set, the potential wrist line being substantially perpendicular to the line that extends in the direction that the one or more potential finger segments are pointing; and
determining that a length of the potential wrist line satisfies one or more predetermined wrist lengths;
and wherein determining that the point set represents the hand of the user is based at least in part on determining that the length of the potential wrist line satisfies the one or more predetermined wrist lengths.

12. The system of claim 5, the acts further comprising:
determining that the potential palm segment satisfies one or more palm criteria; and
segmenting the potential palm segment from the point set.

13. The system of claim 5, the acts further comprising:
determining that the potential finger segment satisfies one or more finger criteria; and
segmenting the potential finger segment from the point set.

14. The system of claim 5, the acts further comprising upon determining that the point set describes the hand of the user, comparing the point set to one or more hand pose models to identify a pose of the hand.

15. One or more non-transitory computer-readable storage media storing computer-readable instructions that, when executed, instruct one or more processors to perform operations comprising:
obtaining a point set;
identifying a local extremum point along an outer boundary of the point set that has a curvature value that satisfies one or more curvature characteristics;
identifying a potential finger segment comprising points from the point set that are based at least in part on the local extremum point;
identifying a centerline of the potential finger segment;
identifying a line segment from the point set based at least in part on the centerline, the line segment extending from the local extremum point of the potential finger segment and terminating at an endpoint;
identifying a centroid of a shape within the point set, the centroid based at least in part on the endpoint of the line segment, the centroid different than the endpoint;
identifying a potential palm segment comprising points from the point set that are at least partly bordered by the potential finger segment, the potential palm segment based at least in part on a location of the centroid;
determining that the potential palm segment satisfies one or more palm criteria; and
determining that the point set represents, at least in part, a hand of a user.

16. The one or more non-transitory computer-readable storage media of claim 15, the operations further comprising:
  identifying a plurality of potential finger segments, the potential finger segment one of the plurality of potential finger segments; and
  determining that at least one of: a length of at least one potential finger segment of the plurality of potential finger segments satisfies one or more predetermined finger lengths, a width of the at least one potential finger segment satisfies one or more finger widths, the at least one potential finger segment includes a particular curvature characteristic, or a quantity of the plurality of potential finger segments satisfies one or more finger quantities.

17. The one or more non-transitory computer-readable storage media of claim 15, wherein:
  the local extremum point is one of a plurality of local extremum points; and
  the operations further comprise determining that a point of the plurality of local extremum points is located within a predetermined distance to another point of the plurality of local extremum points.

18. The one or more non-transitory computer-readable storage media of claim 15, wherein determining that the point set represents the hand of the user is based at least in part on a shape model based on the location of the centroid.

19. The one or more non-transitory computer-readable storage media of claim 15, wherein determining that the potential palm segment satisfies the one or more palm criteria comprises determining that at least one of: a length of the potential palm segment satisfies one or more predetermined palm lengths, a width of the potential palm segment satisfies one or more predetermined palm widths, or a shape of the potential palm segment satisfies one or more predetermined shapes.

20. The one or more non-transitory computer-readable storage media of claim 15, wherein the operations further comprise aligning a shape model to the point set by aligning the shape model to be substantially centered on the centroid, the potential palm segment comprising points of the point set that are within the shape model or are within a predetermined distance of the shape model.

21. The one or more non-transitory computer-readable storage media of claim 15, wherein the operations further comprise:
  identifying a line that extends through the centroid in a direction that the potential finger segment is pointing;
  identifying a potential wrist line that extends from a first side of the point set to a second side of the point set, the potential wrist line being substantially perpendicular to the line that extends in the direction that the potential finger segment is pointing; and
  determining that a length of the potential wrist line satisfies one or more predetermined wrist lengths;
  and wherein determining that the point set represents the hand of the user is based at least in part on determining that the length of the potential wrist line satisfies the one or more predetermined wrist lengths.

22. A method comprising:
under control of one or more computing systems configured with executable instructions,
  obtaining a point set;
  determining that the point set describes, at least in part, a hand of a user, by:
    determining that at least some of the points of the point set correspond to a finger segment based at least in part on a curvature value of a local extremum point from the point set, the local extremum point representing a distal portion of the finger segment;
    determining a centerline of the finger segment;
    determining a line segment from the point set based at least in part on the centerline, the line segment extending from the local extremum point of the finger segment and terminating at an endpoint;
    determining a centroid of a shape within the point set, the centroid based at least in part on the endpoint of the line segment, wherein the centroid of the shape is different than the endpoint;
    determining that at least some of the points of the point set correspond to a palm segment based at least in part on the centroid; and
    determining a wrist line associated with the point set;
  identifying an observed pose of the hand by:
    identifying a pose for the finger segment, the pose of the finger segment comprising a pose from a group of poses including an extended pose, a half-folded pose, and a folded pose; and
    identifying a pose of the palm segment;
  comparing the observed pose of the hand to one or more hand pose models; and
  determining a pose of the hand based at least in part on the comparing.

23. The method of claim 22, wherein the extended pose is associated with a state in which a finger of the user is extended, the half-folded pose is associated with a state in which the finger is bent toward a palm and a distance between a tip of the finger and the palm is greater than a predetermined distance, and the folded pose is associated with a state in which the finger is bent toward the palm and a distance between the tip of the finger and the palm is less than the predetermined distance.

24. The method of claim 22, further comprising, at a time prior to obtaining the point set, identifying the local extremum point.

25. The method of claim 22, further comprising determining a length of the finger segment, the length of the finger segment satisfying a predetermined finger length, wherein the endpoint of the line segment is based at least in part on the length of the finger segment.

* * * * *